Aug. 7, 1945. J. W. TETER 2,381,471
PRODUCTION OF ORGANIC COMPOUNDS CONTAINING NITROGEN
Filed Nov. 13, 1940
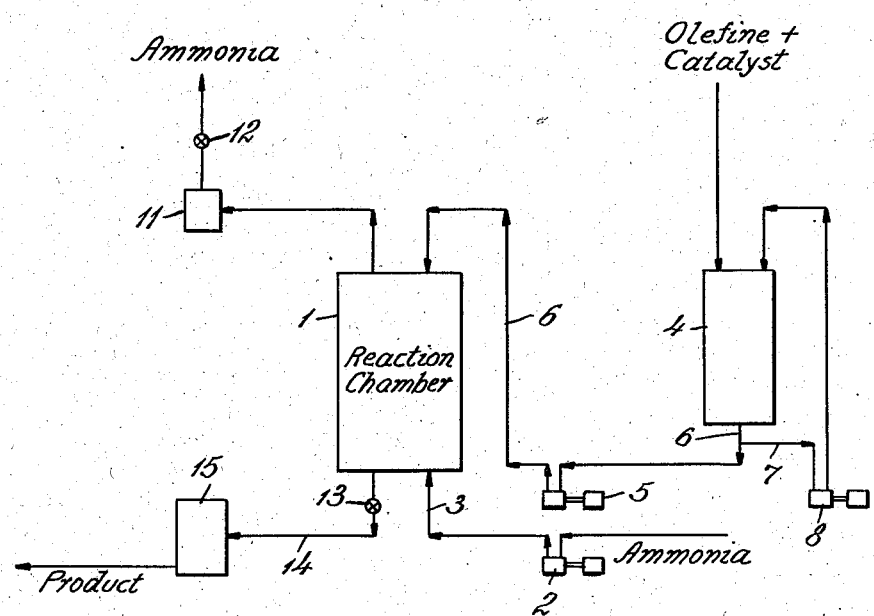
INVENTOR
John W. Teter
BY
ATTORNEYS Patented Aug. 7, 1945

2,381,471

UNITED STATES PATENT OFFICE 2,381,471

PRODUCTION OF ORGANIC COMPOUNDS CONTAINING NITROGEN

John W. Teter, Chicago, Ill., assignor to Sinclair Refining Company, New York, N. Y., a corporation of Maine Application November 13, 1940, Serial No. 365,562

10 Claims. (Cl. 260—464)

This invention relates to the production of amines, nitriles and their derivatives from unsaturated hydrocarbons such as those available in gas mixtures produced in the processing of hydrocarbon oils, as in the refining of petroleum, by direct catalytic reaction with ammonia.

Organic nitrogen compounds such as the amines, nitriles and their derivatives have a variety of present uses in industry and have potentialities of wider use both as addition agents in lubricants and fuels and as raw materials for the production of other chemicals. Amines and their derivatives are useful as anti-knock agents and color stabilizers in motor fuels and as anti-corrosion, anti-sludging, anti-lacquering and color stabilizing agents in lubricants. Nitriles are useful oiliness agents in lubricants and are easily converted to amines. Diamines and dinitriles are particularly important as a source of raw materials for the production of superpolyamides such as nylon. The cost of producing these organic nitrogen compounds by present commercial methods is considerable and restricts their use.

Generically, the reaction of direct amination in accordance with this invention is one in which one N—H bond of ammonia is activated and in which the double bond of an olefine is in the active state. The reaction proceeds when the reactants, thus activated, are in intimate contact. The mechanics of the reaction may be explained as the attachment of one atom of hydrogen from the activated N—H group of the ammonia to one of the double bonded carbon atoms in the olefine and as the attachment of the NH₂ radical of the ammonia to the other double bonded carbon atom of the olefine. This reaction, whereby the primary amine is formed, may be represented as follows:

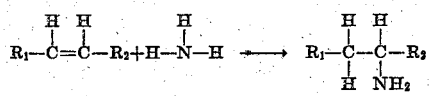

The secondary amine is formed by substitution for one of the hydrogen atoms of the amino radical in the primary amine, involving activation of another N—H bond. Activation of still another N—H bond leads to the formation of the tertiary amine. Dehydrogenation of the amine results in the formation of the corresponding nitrile.

I have discovered that organic nitrogen compounds such as amines and nitriles may be produced by suspending in contact with ammonia and an olefine, and in finely divided form, a catalyst selectively promoting amination of the olefine and by subjecting the resulting mixture to a temperature of about 450° F. to about 750° F. and to a pressure of about 500 pounds per square inch and upward. I have found that by maintaining the finely divided catalyst in admixture with the olefine and ammonia exceptionally high yields may be obtained under the foregoing reaction conditions in a manner which lends itself particularly to continuous operation. Competing reactions of cracking, polymerization, dehydrogenation, and hydrogenation take place simultaneously with the amination reaction to an extent which varies considerably with reaction conditions such as temperature and pressure. The fact that these competing reactions take place simultaneously with the amination reaction and thereby account for at least some portion of the olefine consumed during the amination process requires optimum nitrogen fixation yields to be based upon the amount of olefine consumed. I have found that high yields of organic nitrogen compounds based on olefine consumed are obtained by maintaining the finely divided catalyst in admixture with the olefine and ammonia. This admixture is obtained by maintaining the finely divided catalyst in suspension in the liquefied olefine and in contact with ammonia. Such a suspension of the finely divided catalyst in the liquefied olefine may be maintained with particular advantage by passing gaseous ammonia upwardly through the suspension.

Cracking, which appears to be confined principally to the amine produced by the amination reaction, increases with increasing reaction temperature. Cracking also increases with increasing pressures. Polymerization of the olefine charged to the amination reaction is promoted by the use of high temperatures and increases with increasing time of contact between the reactants and catalyst, thus appreciably depleting the olefine charge. Dehydrogenation of the amine formed as the primary product of the amination reaction converts the amine to the corresponding nitrile, a conversion which is not unduly serious in itself but which liberates hydrogen with resulting hydrogenation of the olefine charge to form the corresponding paraffin hydrocarbon. Dehydrogenation is favored by the use of high temperature but appears to decrease to a substantial extent with increasing pressure. Decreasing dehydrogenation lowers the production of liberated hydrogen and thereby lowers the extent of olefine hydrogenation with increasing pressure.

I have found that nitrogen fixation, that is, the production of organic nitrogen compounds by the amination reaction, in accordance with my invention takes place to an important extent at temperatures from 450° F. to about 750° F., the extent of nitrogen fixation being greater intermediate the extremes of this temperature range than at either extreme of the temperature range. Thus, temperatures from about 500° F. to about 600° F. are highly advantageous and temperatures of about 550° to 575° F. are particularly advantageous. Within the foregoing temperature range, I have found that pressures of 500 pounds per square inch and upward are advantageous. Pressures from about 1000 pounds per square inch to about 3000 pounds per square inch may be used with particular advantage.

The unsaturated hydrocarbons which may be aminated to form organic nitrogen compounds in accordance with my invention may be obtained from any available source. Thus, olefines obtained by dehydrogenation of substantially pure aliphatic organic compounds, such for example as paraffinic hydrocarbons or dehydration of aliphatic alcohols, or olefines available in gas mixtures produced in the processing of hydrocarbon oils, as in the refining of petroleum, may be used with advantage. For example, olefines obtained from cracking of hydrocarbons, such as petroleum, and olefines such as polymer gasoline and other olefine polymers may be aminated in accordance with my invention. I have found, however, that olefines having a double bond at the end of the carbon chain are the most active and are most readily aminated under my reaction conditions. Olefines obtained from the cracking of hydrocarbons, such as petroleum, are characterized by a double bond at the end of their carbon chains and for this reason comprise a particularly advantageous olefinic charging material for the production of organic nitrogen compounds in accordance with my invention.

I have found that the amount of ammonia used with advantage in accordance with my invention should exceed that amount required theoretically to combine with the olefine charged to the amination reaction. Thus, a molar ratio of about 1.6, and higher, mols of ammonia to 1.0 mol of olefine is particularly effective. Ammonia-olefine molar ratios as high as about 3.5/1.0 have been found to be very effective with respect to nitrogen fixation although this larger proportion of ammonia, and particularly ratios substantially higher than 3.5/1.0 appear to increase the amount of cracking taking place during the amination reaction.

Numerous metallic catalysts selectively promote the amination reaction under my reaction conditions. However, cobalt and nickel appear to be the most satisfactory metallic catalysts and of these two catalysts cobalt is superior to nickel. The metallic catalyst is preferably deposited on a suitable support which provides a relatively large catalyst contact surface. Metallic cobalt on silica and metallic cobalt on a cobalt silicate support have been found to be effective catalysts for use in accordance with my invention. Although initially similar in activity the cobalt-on-cobalt silicate catalyst being somewhat less active than the cobalt-on-silica catalyst, these two catalysts differ principally in that the cobalt-on-cobalt silicate catalyst maintains its nitrogen fixation activity for a longer period in use and produces less polymer products than does the cobalt-on-silica catalyst under similar reaction conditions. A catalyst comprising metallic cobalt deposited on a diatomaceous silica has also been found to be capable of selectively promoting the amination reaction. The catalyst should be used in finely divided form to obtain the full benefit of the advantages of my admixed catalyst amination process. Catalyst reduced to a fineness corresponding to about 200 mesh is particularly advantageous.

The following specific operation directed to the catalytic amination of dodecene will illustrate the process of the invention, although it must be understood that my process is not limited to this specific operation. Dodecene-1 was prepared by dehydration of n-lauryl alcohol over granular alumina, the lauryl alcohol being obtained in the form marketed by du Pont under the trade name of "Palmal No. 23." The olefine was separated from unconverted alcohol by fractionation. The dodecene-1 thus obtained had a boiling point of 421°–425° F., a specific gravity of 0.7634, a refractive index of 1.4330, a bromine addition number of 85.5 and a bromine substitution number of 2.5. The dodecene-1 thus prepared was then used as the olefine charged to the amination process in this example.

The reaction chamber 1, shown in the accompanying schematic drawing, having an internal volume of about 2000 cc. was filled with one-quarter inch stainless steel Raschig rings. The free space remaining within the reaction vessel was about 1500 cc. by direct measure. Before starting operation the reaction chamber 1 was charged with 178 g. of catalyst and 700 cc. of dodecene-1. The catalyst was obtained by precipitating cobalt hydroxide on a cobalt silicate precipitate suspended in an aqueous medium. The resulting precipitate was thoroughly washed with water and was dried and had a density of 0.74. The dried precipitate was reduced to a finely divided condition in a ball mill and was screened through a 200 mesh screen. The finely divided dried precipitate was then reduced in a steady stream of hydrogen for seventy-five hours at a temperature of 660° F. with the resulting production of a finely divided catalyst comprising metallic cobalt on a cobalt silicate support.

Liquid ammonia was forced by pump 2 through line 3 into the lower portion of the reaction chamber 1 at the rate of about 243 cc. per hour, and the reaction vessel was heated electrically while ammonia was being charged to the reaction chamber until a temperature of 500° F. and a pressure of about 1000 pounds per square inch was obtained within the reaction chamber. A uniform suspension comprising 8% by weight of the finely divided catalyst in liquefied dodecene obtained from the mixing chamber 4 was then forced by means of pump 5 through line 6 into the reaction vessel 1 at the rate of about 456 cc. per hour. These continuous charging rates of ammonia and dodecene represent the charging of 4.65 mols of ammonia for each mol of dodecene. This suspension of catalyst in dodecene was charged continuously to the reaction chamber starting with the time at which the reaction temperature of 500° F. and reaction pressure of 1000 pounds per square inch was obtained within the reaction chamber. A uniform suspension of the finely divided catalyst in the liquid olefine was maintained within the mixing chamber 4 by continuously by-passing a portion of the suspension from line 6 at a point located between the mixing chamber 4 and the pump 5 by forcing this portion of the suspension by means of pump 8 into the upper portion of the mixing chamber 4.

The liquid ammonia charged to the reaction chamber through line 3 was transformed into its vapor state by the high reaction temperature prevailing within the reaction chamber 1 and the resulting gaseous ammonia passed upwardly through the suspension of finely divided catalyst in liquefied dodecene within the reaction chamber. Unreacted gaseous ammonia was removed from the upper portion of the reaction chamber through line 10 and the liquid trap 11. The liquid trap 11 was heated externally to maintain the unreacted ammonia in vapor phase in order to control the reaction pressure. Gaseous ammonia was released from the liquid trap through pressure release valve 12 for subsequent recovery.

Liquid product was released continuously through valve 13 and line 14 into the product receiver 15 after the suspension of finely divided catalyst in liquefied dodecene had been charged to the reaction chamber for one and three-quarters hours. The catalyst first appeared in the liquid product about four and one-half hours after charging of the catalyst-dodecene suspension was instituted. Dismantling and inspection of the reaction chamber at the expiration of this illustrative run showed that about 68% of the catalyst was distributed in the upper half of the reaction chamber and about 32% of the catalyst in the lower half of the chamber. The catalyst did not pack in the reaction chamber and was well distributed throughout the packing rings.

In order to obtain an analysis of the final liquid product, that portion of the liquid product which was obtained between two and one-half and four hours after charging of the catalyst-dodecene suspension was instituted was subjected to fractional distillation with the separation of three fractions. The first fraction was that boiling between 150° F. and 400° F. and will be designated herein as the low boiling fraction. The intermediate fraction was that portion of the liquid product boiling between 400° and 410° F. and comprised essentially the unreacted dodecene. The high boiling fraction, that is the fraction boiling above 410° F., contained the major proportion of the organic nitrogen compounds produced during the amination reaction. Nitrogen content determinations, and hence organic nitrogen compound determinations, were made by the Kjeldahl method in each instance where such determinations are reported herein.

Organic nitrogen compounds contained in the low boiling fraction comprised nitrogenous compounds produced essentially by the cracking of the lauryl amine produced by amination of dodecene and appeared, by chemical analysis, to be essentially octyl nitrile. The organic nitrogen compounds contained in the high boiling fraction comprised essentially lauryl amine and lauryl nitrile. The total yield of organic nitrogen compounds from the low boiling and high boiling fractions was 3.93% by weight of the olefine charged during the period over which the liquid product was obtained. This yield represented the production of 13.3% by weight of organic nitrogen compounds based on olefine consumed, of which yield 13.0% was high boiling nitrogen compounds (obtained in the high boiling fraction) and 0.3% was low boiling nitrogen compounds (obtained from the low boiling fraction).

Calculations based on the analyses of the low boiling, intermediate, and high boiling fractions for organic nitrogen compounds show that of the olefine charged to the reaction 29.5% by weight of the olefine was consumed as follows: 3.53% converted to organic nitrogen compounds, 2.92% as cracked products, 12.5% as hydrogenated products, 9.15% as polymerized products, and 1.4% lost. The remainder of the olefine, comprising 70.5% of the olefine charge, was unconverted and was recovered for further conversion into organic nitrogen compounds either by recycling to the reaction chamber or by separate amination in contact with an additional quantity of ammonia and catalyst.

It is interesting to compare the catalyst activity and process efficiency of this amination process employing finely divided catalyst admixed with the reactants with the catalyst activity and process efficiency of the amination of an olefine with ammonia in contact with a fixed bed of catalyst. In the fixed bed process using a bed of catalyst comprising ⅛ inch pellets of the same catalyst used in the foregoing example, a temperature of 550° F. and a pressure of about 2000 pounds per square inch were maintained within the catalyst bed and a mixture of ammonia and dodecene-1 was passed through the bed under these conditions in the relative proportion of about 3.6 mols of ammonia to 1.0 mol of dodecene. In the admixed catalyst operation of this invention approximately three times the volume of olefine was in contact with a gram of catalyst as in the fixed-bed catalyst operation, and the total contact time between the reactants and catalyst was approximately 130% as long in the fixed-bed catalyst operation as in the admixed catalyst operation. Olefine consumption in the admixed catalyst operation was only about 68% of the olefine consumption in the fixed-bed catalyst operation. Without regard to the contact time, the catalyst activity, as shown by nitrogen fixation based on the olefine charged per 100 g. of catalyst, was about 170% as great for the admixed catalyst operation as for the fixed-bed catalyst operation, and nitrogen fixation based on olefine consumed was about 250% as great for the admixed catalyst operation as for the fixed-bed catalyst operation. Nitrogen fixation based on olefine consumed per 100 g. of catalyst for 1.0 hour of contact time was about three and one-half times as great for the admixed catalyst operation as for the fixed-bed catalyst operation. Nitrogen fixation based on olefine consumed per 100 g. of catalyst per 100 cc. of olefine per hour was about 160% as great for the admixed catalyst operation as for the fixed-bed catalyst operation. Thus, the admixed catalyst operation of this invention is superior to the fixed bed catalyst operation when compared on a unit weight of catalyst basis, on a contact time basis, and on a given unit capacity basis.

The yield of organic nitrogen compounds, based on olefine consumed, obtained by passing an olefine and ammonia through a fixed bed of catalyst under optimum reaction conditions is nearly double the yield obtained by maintaining a similar amount of olefine and ammonia in fixed contact with the catalyst under the same conditions and equivalent contact period within a sealed reaction vessel. The yield of organic nitrogen compounds, based on olefine consumed, obtained in accordance with the present invention is greater than the yield obtained by the fixed-bed catalyst operation. Furthermore, the admixed catalyst process of the present invention, particularly at optimum reaction temperature and pressure, is characterized by less polymerization, dehydrogenation, and hydrogenation than amination with the fixed-bed catalyst operation under similar reaction conditions and therefore leads to improved control of the amination reaction. The process of direct amination of olefines using an admixed selective catalyst affords a new and less expensive continuous method of producing organic nitrogen compounds such as amines, nitriles and their derivatives and of producing certain amines, nitriles and their derivatives which have not hitherto been produced by commercial methods.

I claim:

1. In the production of amines and nitriles, the improvement which comprises suspending in contact with ammonia and an olefine and in finely divided form a catalyst selectively promoting amination, and subjecting the resulting mixture to a temperature substantially within the range of 450° F. to 750° F. and a pressure of at least substantially 500 pounds per square inch.

2. In the production of amines and nitriles, the improvement which comprises suspending in contact with ammonia and an olefine and in finely divided form a catalyst selectively promoting amination, and subjecting the resulting mixture to a temperature substantially within the range of 500° F. to 600° F. and a pressure of at least substantially 1000 pounds per square inch.

3. In the production of amines and nitriles, the improvement which comprises suspending in contact with ammonia and an olefine and in finely divided form a catalyst selectively promoting amination, and subjecting the resulting mixture to a temperature of substantially 550° F. and a pressure of at least substantially 1000 pounds per square inch.

4. In the production of amines and nitriles, the improvement which comprises passing gaseous ammonia upwardly through a liquefied olefine having suspended therein a catalyst selectively promoting amination of the olefine at a temperature substantially within the range of 450° F. to 750° F. and at a pressure of at least substantially 500 pounds per square inch.

5. In the production of amines and nitriles, the improvement which comprises passing gaseous ammonia upwardly through a liquefied olefine having suspended therein a catalyst selectively promoting amination of the olefine at a temperature substantially within the range of 500° to 600° F. and at a pressure of at least substantially 1000 pounds per square inch.

6. In the production of amines and nitriles, the improvement which comprises passing gaseous ammonia upwardly through a liquefied olefine having suspended therein a catalyst selectively promoting amination of the olefine at a temperature of substantially 550° F. and at a pressure of at least substantially 1000 pounds per square inch.

7. In the production of amines and nitriles, the improvement which comprises introducing into a reaction chamber a suspension comprising a liquefied olefine having suspended therein in finely divided form a catalyst selectively promoting amination of the olefine, passing gaseous ammonia upwardly through said suspension in the reaction chamber, and subjecting the resulting mixture within the reaction chamber to a temperature substantially within the range of 450° F. to 750° F. and a pressure of at least substantially 500 pounds per square inch.

8. In the production of amines and nitriles, the improvement which comprises continuously introducing into a reaction chamber a suspension comprising a liquefied olefine having suspended therein in finely divided form a catalyst selectively promoting amination of the olefine, continuously passing gaseous ammonia upwardly through said suspension in the reaction chamber, subjecting the resulting mixture within the reaction chamber to a temperature substantially within the range of 450° F. to 750° F. and a pressure of at least substantially 500 pounds per square inch, continuously removing unreacted gaseous ammonia from the upper portion of the reaction chamber, and continuously removing reaction products from the lower portion of the reaction chamber.

9. In the production of amines and nitriles, the improvement which comprises suspending in contact with ammonia and an olefine and in finely divided form a metallic cobalt catalyst selectively promoting amination, and subjecting the resulting mixture to a temperature substantially within the range of 450° F. to 750° F. and a pressure of at least substantially 500 pounds per square inch.

10. In the production of amines and nitriles, the improvement which comprises suspending in contact with ammonia and an olefine and in finely divided form a metallic cobalt catalyst selectively promoting amination, and subjecting the resulting mixture to a temperature of 550° F. and a pressure of at least substantially 1000 pounds per square inch.

JOHN W. TETER.